July 10, 1928.   
R. H. BEAUMONT   
1,676,765

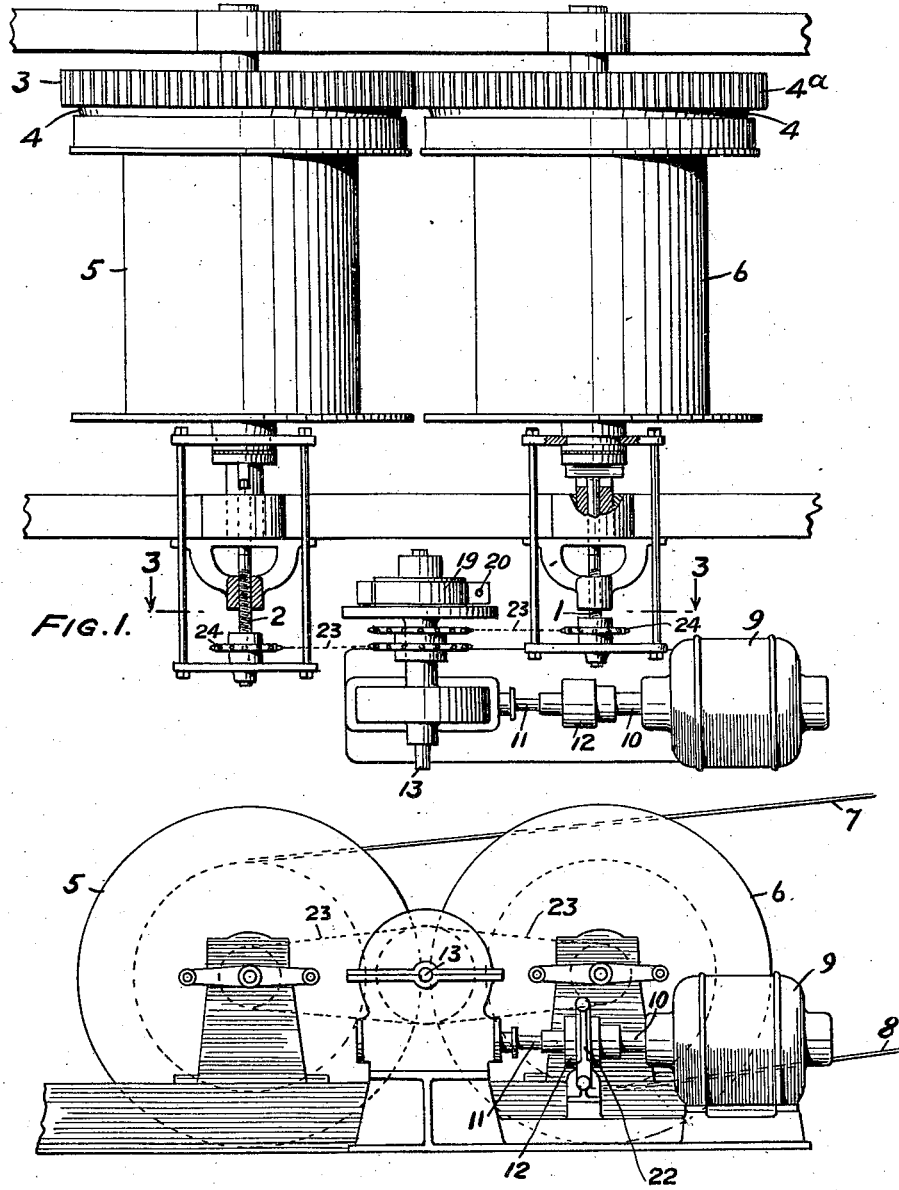

MECHANISM FOR OPERATING WINDING DRUM FRICTION CLUTCHES

Filed Feb. 16, 1927   2 Sheets-Sheet 2

WITNESS:
Robt R Mitchel

INVENTOR
Robert H. Beaumont
BY
Augustus B. Stoughton
ATTORNEY.

Patented July 10, 1928.

1,676,765

UNITED STATES PATENT OFFICE.

ROBERT H. BEAUMONT, OF RADNOR, PENNSYLVANIA, ASSIGNOR TO R. H. BEAUMONT COMPANY, OF PHILADELPHIA, PENNSYLVANIA, A CORPORATION OF PENNSYLVANIA.

MECHANISM FOR OPERATING WINDING-DRUM FRICTION CLUTCHES.

Application filed February 16, 1927. Serial No. 168,491.

Objects of the present invention are to avoid jamming of the friction clutch; to permit of the use of an overpowered torque motor; to, if desired, avoid stalling the motor; to provide for relatively adjusting the time of engagement of the friction clutches and to compensate for their wear; to facilitate starting the motor; and to prevent the mechanism from hunting or overrunning which is likely to produce objectionable whipping of cables actuated by the drum.

Other objects of the invention will appear from the following description and the invention may be said to comprise mechanism for operating winding drum friction clutches including a motor, and power transmission mechanism interposed between the friction clutches and the motor and including a friction drive device arranged and adapted to absorb motor torque.

The invention also comprises the improvements to be presently described and finally claimed.

In the following description reference will be made to the accompanying drawings forming part hereof and in which Figure 1 is a top or plan view of one form of mechanism embodying features of the invention for operating winding drum friction clutches.

Fig. 2 is an elevational view of the same.

Figure 3:
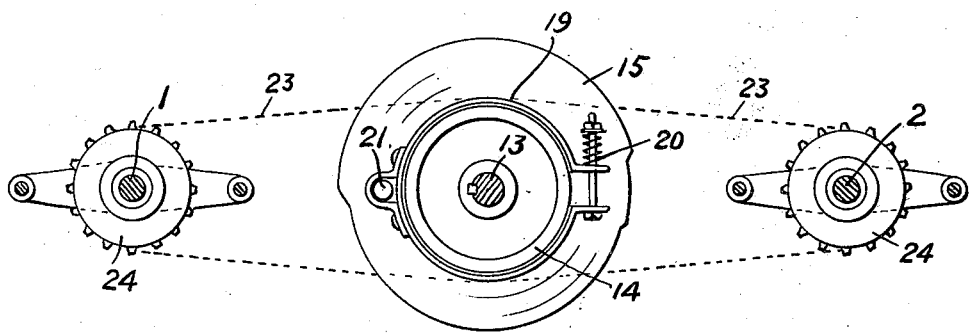
Fig. 3 is a sectional view taken on the line 3—3 of Fig. 1 and drawn to an enlarged scale.

Referring to the drawings there are winding drum friction clutches. With the exception that the screws 1 and 2 by which they are actuated are one righthanded and the other lefthanded, these mechanisms are duplicates and one of them will be described. The intermeshing gear wheels 3 and 4ª are positively driven, and by the friction clutches 4, one or the other of the drums 5 and 6 is connected to its corresponding gear wheel to wind one of the cables 7 or 8 and to play out the other cable, and by these clutches 4, both drums may be disconnected from the gear wheels so that both drums are at rest. Mechanism of the character described is usually, though not necessarily, employed for operating drag scrapers and in that use it is easily associated with an electrical distant control constructed and arranged to permit the operator to start, stop and reverse the motion of the drag scraper. There is nothing new about the mechanism referred to and examples of it are to be found in Letters Patent No. 1,569,925 of January 19, 1926, to W. E. Hale, and in Letters Patent No. 1,577,161 of March 16, 1926, to R. H. Beaumont.

Referring to the drawings there is a motor 9 usually of the type called a torque motor and such a motor is a provision of the mechanism referred to in the above patents. There is a power transmission mechanism interposed between the friction clutches and the motor, and in the patents above referred to are shown types of such transmission mechanism. However, by the present invention there is provided a power transmission mechanism including novel features and adapted to correct faults heretofore existing and to accomplish results not heretofore attained. It is a fact that certain features of the improvements referred to are applicable as additions or substitutions in the mechanisms of the patents above referred to.

Figure 4:
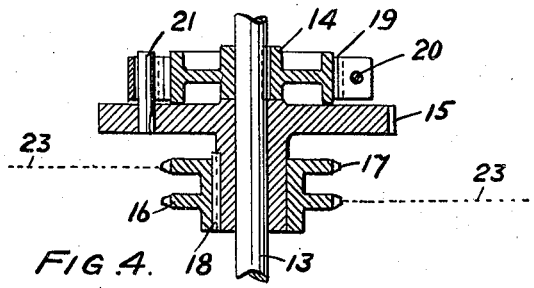
Fig. 4 is a horizontal central sectional view drawn to an enlarged scale of a part of the mechanism shown in Fig. 1.

The shaft 10 of the motor 9 is connected with the worm drive shaft 11, as shown, by means of a lost motion coupling 12. When the coupling 12 is of the lost motion variety it permits the motor shaft 10 to run ahead of the worm drive shaft 11 through a part of a revolution, and the advantage of this will be hereinafter set forth. The driven shaft 13, Fig. 4, operates through a friction slip drive device to position the friction clutches. As shown, Fig. 4, the drum 14 is keyed or otherwise fast on the shaft 13, and the cam 15 and sprocket chain wheels 16 and 17 are loose for rotation in respect to the shaft 13 but are connected together as by a key 18. As shown the friction slip drive device comprises a split spring pressed band 19 lined with appropriate material and adapted to cooperate with the face of the drum 14. The spring and bolt 20 afford means for increasing and diminishing the friction between the band 19 and the face of the drum 14. The friction slip drive device also comprises a pin or post 21 rigid with the cam 15 and engaging a staple on the band 19. 22 is a magnetic brake, Fig. 2, shown as arranged to cooperate with the coupling 12. 23 are sprocket chains cooperating with the sprocket wheels 17 and 16 and with the sprocket wheels 24 mounted on the screws 1 and 2.

The mode of operation of the described mechanism may be explained as follows:

Rotation of the motor 9 in one direction, acting through the described friction slip drive device, shifts one or the other of the drums 5 and 6 to engage the corresponding friction clutch 4, for example, the friction clutch appertaining to the drum 6. Rotation of the motor 9 in the other direction causes engagement of the clutch 4 of the drum 5, thus one or the other of the cables 7 and 8 is wound on, whilst the other cable is free to play out. There is a position in the movement of the motor 9 when both clutches 4 are disengaged. In application to a drag scraper, the operator by controlling the motor 9 may draw the scraper in or out or cause it to remain stationary.

It may be remarked that the cam 15 is a part of usual electrical equipment by which the motor is caused to run to put both clutches 4 out of engagement. As a part of this electrical equipment the magnetic brake 22 may be operated to check the motor more particularly when it is intended to stop it with both friction clutches 4 out of engagement. The fact that the coupling 12 is of the lost motion variety enables the motor to start before it has to overcome the friction of rest of the power transmission mechanism. The sprocket chain drives 23 have advantages among which may be mentioned the facility with which the drum clutch screws or levers may be angularly shifted in respect to each other in order to time the operation of the clutches 4 and in order to compensate for wear of their friction surfaces. The friction slip drive device is adapted to absorb torque of the motor 9, thus by slipping preventing the clutches 4 from being jammed and also permitting the motor to continue to turn after one of the clutches 4 has been properly engaged. Furthermore the motor may be more powerful than is necessary by reason of its standard design or the like in which case it can run without jamming the clutches 4, so that the specially designed motor need not in all cases be stalled.

Figure 5:
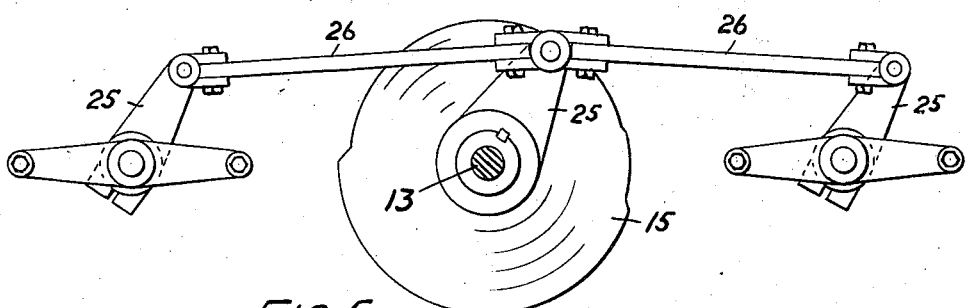
Fig. 5 is a view similar to Fig. 3 but looking in the opposite direction and illustrating a modification.
Figure 6:
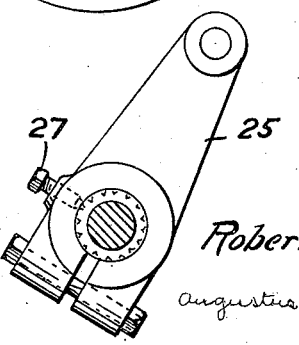
Fig. 6 illustrates a detail of construction.

The construction and mode of operation of the modifications shown in Figs. 5 and 6 are as has been above described except that crank arms 25 and links 26 replace the sprocket gear above referred to, and in Fig. 6 the crank arm 25 is shown as angularly adjustable through the intervention of the set screw 27.

It will be obvious to those skilled in the art to which the invention relates that modifications may be made in details of construction and arrangement and in matters of mere form without departing from the spirit of the invention which is not limited to such matters or otherwise than the prior art and the appended claim may require.

I claim:

Mechanism for operating two winding drums comprising power mechanism, two friction clutches having positively driven elements and movable elements for respectively connecting the drums with the power driven elements, power transmission mechanism connected with the two movable elements and movable in opposite directions to cause the engagement of one clutch and the release of the other clutch, and a reversible motor having connection with said power transmission mechanism to move it in either direction, said power transmission mechanism including a friction slip drive device, and said motor being constructed and arranged to stall when said power transmission mechanism reaches its limit of movement in either direction and the motor thereby serving to continue to apply force which, limited by the friction drive device, serves to hold the corresponding friction clutch in engagement and to avoid jamming it.

ROBERT H. BEAUMONT.